(12) United States Patent
Hoshuyama

(10) Patent No.: US 7,138,663 B2
(45) Date of Patent: Nov. 21, 2006

(54) COLOR SEPARATION DEVICE OF SOLID-STATE IMAGE SENSOR

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 198 days.

(21) Appl. No.: 10/732,462

(22) Filed: Dec. 11, 2003

(65) Prior Publication Data

US 2005/0213221 A1    Sep. 29, 2005

(30) Foreign Application Priority Data

Dec. 18, 2002   (JP) ............................. 2002-366297

(51) Int. Cl.
*H01L 27/15*   (2006.01)
(52) U.S. Cl. .................. 257/98; 257/432; 257/434; 257/435; 257/E33.067; 257/E33.068
(58) Field of Classification Search ............. 257/89, 257/98, 431–32, 434–36, 440, 432, 435, 257/E33.067, E33.068; 438/48, 29, 22, 25, 438/26, 27; 359/629, 634
See application file for complete search history.

(56) References Cited

U.S. PATENT DOCUMENTS

| | | | | |
|---|---|---|---|---|
| 4,654,698 A | * | 3/1987 | Langworthy | 348/238 |
| 5,566,007 A | * | 10/1996 | Ikeda et al. | 349/5 |
| 5,621,550 A | * | 4/1997 | Oku | 349/5 |
| 5,648,870 A | * | 7/1997 | Mistutake | 359/487 |
| 5,866,911 A | * | 2/1999 | Baer | 250/458.1 |
| 6,049,364 A | * | 4/2000 | Takahara et al. | 349/10 |
| 6,078,429 A | * | 6/2000 | Lyon | 359/634 |
| 6,104,458 A | * | 8/2000 | Fukuda | 349/95 |
| 6,517,209 B1 | * | 2/2003 | Huang | 353/81 |
| 6,556,264 B1 | * | 4/2003 | Hirakata et al. | 349/110 |
| 6,760,121 B1 | * | 7/2004 | Kimura et al. | 358/1.7 |
| 6,798,580 B1 | * | 9/2004 | Ohishi et al. | 359/634 |
| 2002/0131022 A1 | * | 9/2002 | Shibatani et al. | 353/31 |
| 2003/0024905 A1 | * | 2/2003 | Tanaka | 219/121.6 |
| 2003/0063210 A1 | * | 4/2003 | Tsuboi | 348/340 |
| 2003/0143337 A1 | * | 7/2003 | Tanaka | 427/508 |

FOREIGN PATENT DOCUMENTS

| | | |
|---|---|---|
| JP | A 5-168023 | 7/1993 |
| JP | A 6-141327 | 5/1994 |

* cited by examiner

*Primary Examiner*—Eugene Lee
(74) *Attorney, Agent, or Firm*—Oliff & Berridge, PLC

(57) ABSTRACT

A microlens condenses incident light to an opening. Light passed through the opening reaches a first dichroic mirror. The first dichroic mirror passes blue light and reflects green and red light. Only the blue light is incident on a first light receiving surface. The first dichroic mirror leads the green and red light to a second dichroic mirror. The second dichroic mirror passes the green light and reflects the red light. Only the green light is incident on a second light receiving surface. The second dichroic mirror leads the red light to a third dichroic mirror. The third dichroic mirror reflects the red light. Therefore, the red light is incident on a third light receiving surface.

3 Claims, 5 Drawing Sheets

F I G. 4
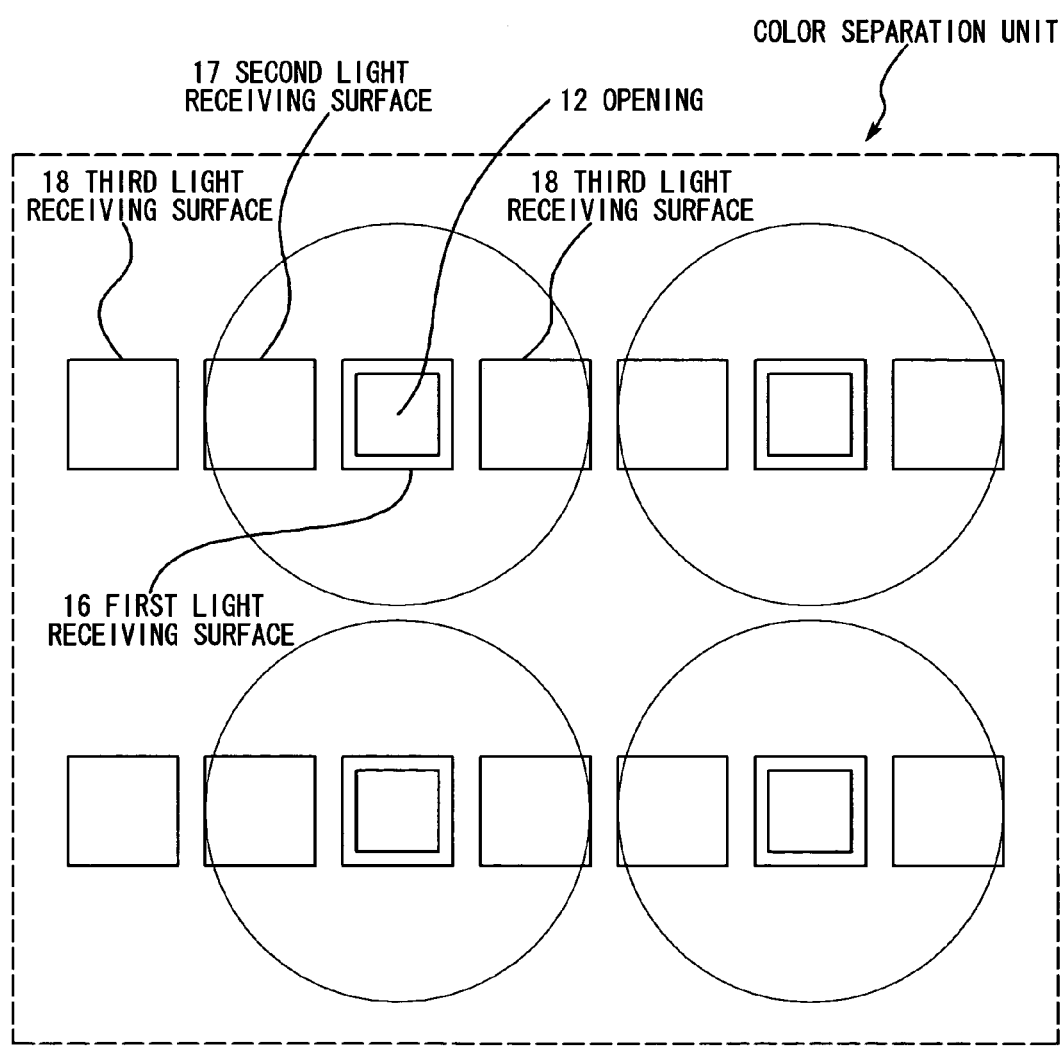

COLOR SEPARATION DEVICE OF SOLID-STATE IMAGE SENSOR

BACKGROUND OF THE INVENTION

1. Field of the Invention

This application is based upon and claims the benefit of priority from the prior Japanese Patent Application No. 2002-366297, filed on Dec. 18, 2002, the entire contents of which are incorporated herein by reference.

The present invention relates to a color separation unit of a solid-state image sensor which is particularly suited for providing an image without false color, by increasing the efficiency of color separation to increase the sensitivity of the solid-state image sensor.

2. Description of the Related Art

In a color imaging device such as a color video camera and the like, a color separation unit for separating light from a light source into three primary colors mainly adopts one of two methods.

The first method is a three-color separation dichroic prism (three-CCD) method. In the three-CCD method, incident light having been color-separated by the color separation unit, which includes three prisms, an air layer, and a plurality of dichroic filters (for example, a red reflection filter and a blue reflection filter), is applied to the three CCDs. Japanese Unexamined Patent Application Publication No. Hei 5-168023, for example, discloses the three-CCD method (refer to FIG. 2 of the patent document).

In the second method, that is, a single-CCD method, a color separation filter of primary color or additive complementary color is disposed on each light receiving surface of a CCD. Japanese Unexamined Patent Application Publication No. Hei 6-141327, for example, discloses the single-CCD method (refer to page 2 of the patent document).

The three-CCD color separation unit is large and expensive due to the complex structure of an optical system. The single-CCD color separation unit, on the other hand, has the advantage that it is simple, small, and inexpensive. Thus, a video camera, a digital still camera and the like generally use the single-CCD color separation unit.

However, the single-CCD color separation unit has the following problems.

First, the color separation filters disposed in front of the CCD decrease photon utilization efficiency. Therefore, the sensitivity of the CCD decreases.

Second, the different color (red, green or blue) filter is disposed in front of each light receiving surface of the CCD. The color separation filters are arranged in, for example, well-known Bayer Array. Accordingly, the red, green, and blue light receiving surfaces are spatially separate from one another, so that data outputted from each light receiving element corresponding to each light receiving surface has to be interpolated to actualize color. Therefore, there is a problem that false color, which does not exist in reality, appears.

The foregoing problems will be hereinafter described in detail.

FIG. 5 is a sectional view of a color separation unit of a conventional single-CCD image sensor. FIG. 6 is a graph showing the spectral transmittance of a color separation filter used in the color separation unit of FIG. 5.

Referring to FIG. 5, incident light condensed by microlenses 1 is incident on light receiving surfaces 7, 8, and 9 through color filters 4, 5, and 6 which are provided in openings 2 formed in a mask layer 3. The color filters 4, 5, and 6 are blue, red, and green color filters, respectively. Of light incident on the blue color filter 4, only blue light reaches the light receiving surface 7, because the blue color filter 4 absorbs green and red light. Thus, a light receiving element corresponding to the light receiving surface 7 converts the blue light into an electric signal. Likewise, a light receiving element corresponding to the light receiving surface 8 converts red light into an electric signal, and a light receiving element corresponding to the light receiving surface 9 converts green light into an electric signal.

As is apparent from the foregoing description, taking a case of the light receiving element corresponding to the red light receiving surface 8, for example, green and blue light is not contributable to the photoelectric conversion, so that the photon utilization efficiency decreases. As for the light receiving elements corresponding to the green and blue light receiving surfaces 7 and 9, the photon utilization efficiency decreases in a like manner.

In the conventional color separation unit, as shown in FIG. 5, the blue, red, and green light receiving surfaces 7, 8, and 9 are spatially separate from one another. Thus, when there is the difference in luminance between adjoining colors (pixels), false color, which does not exist in a subject, appears in an image. In other words, when white exists next to black, for example, gray, which does not exist in reality, appears as the false color, because color interpolation is carried out in the prior art by correlating the adjoining light receiving elements. To restrain the appearance of false color, it is necessary to provide false color restraining means such as an optical low-pass filter, an image signal processing, and the like, so that the cost of a device, which is provided with the solid-state image sensor, increases.

Also, there may be cases where the false color restraining means cannot restrain the appearance of false color enough, so that the false color degrades the sharpness of an image.

SUMMARY OF THE INVENTION

An object of the present invention is to provide a color separation unit of a solid-state image sensor which increases the photon utilization efficiency of each photoelectric transducer.

Another object of the present invention is to provide a color separation unit of a solid-state image sensor which prevents the appearance of false color to enhance image quality.

To achieve the above objects, a color separation unit of a solid-state image sensor according to the first embodiment includes: a microlens which condenses light to an opening provided in a mask layer; a first optical element which receives light condensed by the microlens through the opening, to divide the light into light to be transmitted and light to be reflected in accordance with wavelengths of the light received; a first light receiving surface which receives light passed through the first optical element; a second optical element which receives light reflected by the first optical element to divide the light into light to be transmitted and light to be reflected in accordance with wavelengths of the received light different from those of the first optical element; a second light receiving surface which receives light reflected by the second optical element; a third optical element which receives and reflects light passed through the second optical element; and a third light receiving surface which receives light reflected by the third optical element.

It is preferable that the first and second optical elements are dichroic mirrors.

It is also preferable that the first optical element passes blue light to lead the blue light to the first light receiving surface, and reflects green and red light to lead the green and red light to the second optical element. It is preferable that the second optical element reflects the green light to lead the green light to the second light receiving surface, and passes the red light to lead the red light to the third optical element. Furthermore, it is preferable that the third optical element reflects the red light, and absorbs infrared rays.

According to the first embodiment, light condensed by the microlens is led to the first to third light receiving surfaces without being absorbed by a color filter. Therefore, the photon utilization efficiency increases, and the sensitivity of the solid-state image sensor is improved. Since the light to be led to the first to third light receiving surfaces has been passed through the same opening, it is in the same spatial position. Therefore, false color does not appear.

To achieve the above objects, a color separation unit of a solid-state image sensor according to the second embodiment includes: a microlens which condenses light to an opening provided in a mask layer; a first optical element which receives luminous flux condensed by the microlens through the opening, to divide the light into light to be transmitted and light to be reflected in accordance with wavelengths of the light received; a first light receiving surface which receives light passed through the first optical element; a second optical element which receives light reflected by the first optical element to divide the light into light to be transmitted and light to be reflected in accordance with wavelengths of the received light different from those of the first optical element; a second light receiving surface which receives light reflected by the second optical element; a third optical element which receives light passed through the second optical element to divide the light into light to be transmitted and light to be reflected in accordance with wavelengths of the received light different from those of the first and second optical elements; and a third light receiving surface which receives light reflected by the third optical element.

It is preferable that the first, second, and third optical elements are dichroic mirrors.

It is also preferable that the first optical element passes blue light to lead the blue light to the first light receiving surface, and reflects green and red light to lead the green and red light to the second optical element. It is preferable that the second optical element reflects the green light to lead the green light to the second light receiving surface, and passes the red light to lead the red light to the third optical element. Furthermore, it is preferable that the third optical element reflects red light and absorbs infrared rays.

According to the second embodiment, as in the case of the first embodiment, since the red, blue, and green light passes through the same opening, the photon utilization efficiency of the light receiving element can be increased. In addition, the red, blue, and green light is in the same spatial position, so that false color does not appear.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 is a top plan view of the color separation unit of the solid-state image sensor shown in FIG. 1;

DESCRIPTION OF THE PREFERRED EMBODIMENTS

The embodiments of the present invention will be hereinafter described.

A first embodiment of the present invention will be hereinafter described.

Figure 1:
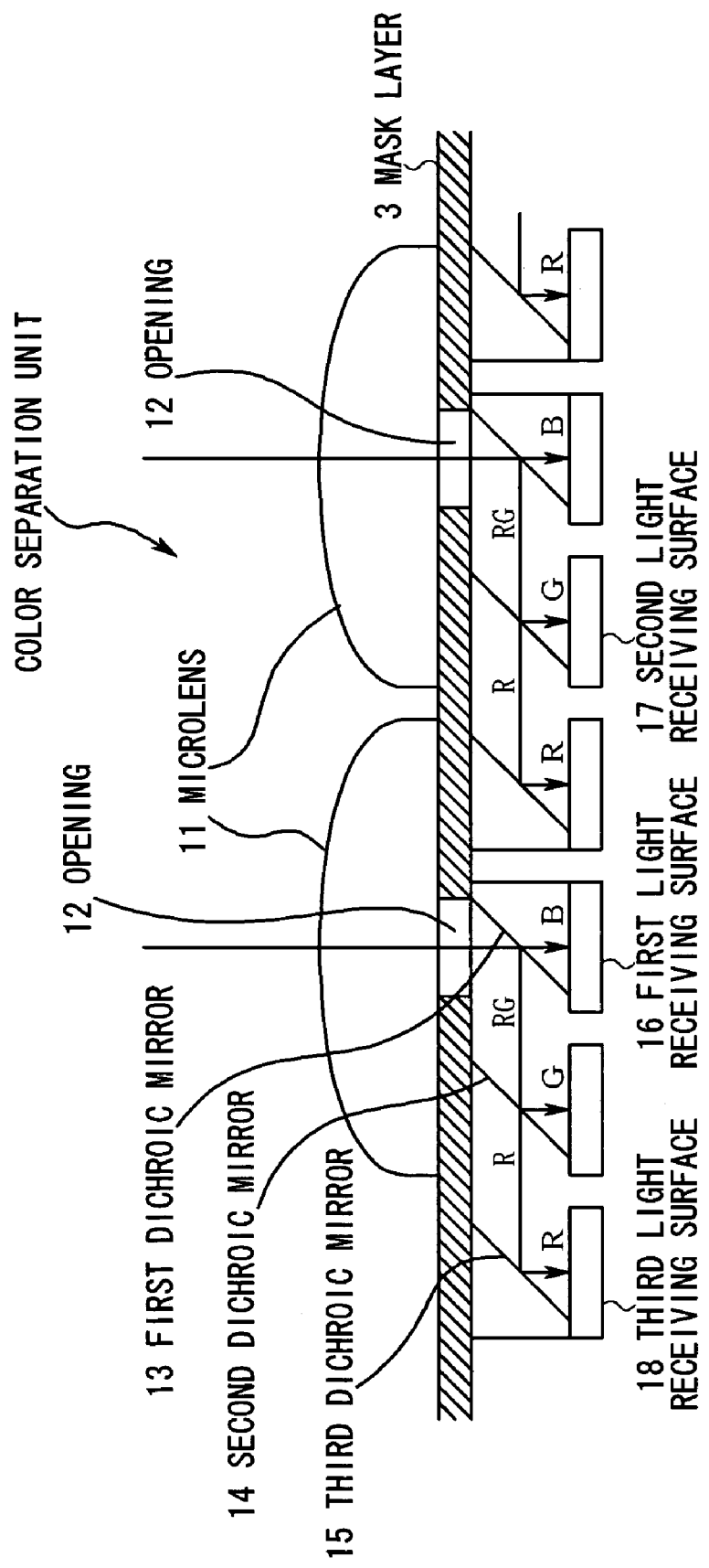
FIG. 1 is a sectional view showing one embodiment of a color separation unit included in a solid-state image sensor of the present invention.

FIG. 1 is a sectional view showing one embodiment of a color separation unit included in a solid-state image sensor of the present invention. In the embodiment shown in FIG. 1, the color separation unit includes dichroic mirrors as color separation elements.

As shown in FIG. 1, incident light is condensed to openings 12 by microlenses 11.

Light passed through the opening 12 reaches a first dichroic mirror 13. The first dichroic mirror 13 has the function of passing blue light and reflecting green and red light. Thus, only blue light is incident on a first light receiving surface 16. A not-illustrated photoelectric transducer (CCD) converts blue light incident on the first light receiving surface into electric signals.

The first dichroic mirror 13 leads green and red light to a second dichroic mirror 14. The second dichroic mirror 14 has the function of passing green light and reflecting red light. Thus, only green light is incident on a second light receiving surface 17. A not-illustrated photoelectric transducer (CCD) converts green light incident on the second light receiving surface 17 into electric signals.

The second dichroic mirror 14 leads red light to a third dichroic mirror 15. The third dichroic mirror 15 has the function of reflecting red light at least. Thus, only red light is incident on a third light receiving surface 18. A not-illustrated photoelectric transducer (CCD) converts red light incident on the third light receiving surface 18 into electric signals.

The third dichroic mirror shown in FIG. 1 may have the function of reflecting infrared rays. In this case, it is possible to eliminate the effect of infrared rays in photoelectric conversion. Similarly, the third dichroic mirror shown in FIG. 1 may have the function of absorbing infrared rays. By reflecting or absorbing infrared rays like this, it is unnecessary to provide a special infrared rays shielding filter in the color separation unit.

Although it is not illustrated, the first to third light receiving surfaces 16 to 18 are electrically connected to each photoelectric transducer (one pixel) of a CCD.

Though the embodiment (the sectional view) of FIG. 1 does not show it, the microlens 11, a mask layer 3, the first to third dichroic mirrors 13 to 15, and the first to third light receiving surfaces 16 to 18 are integrally solidified with resin or the like.

Figure 2:
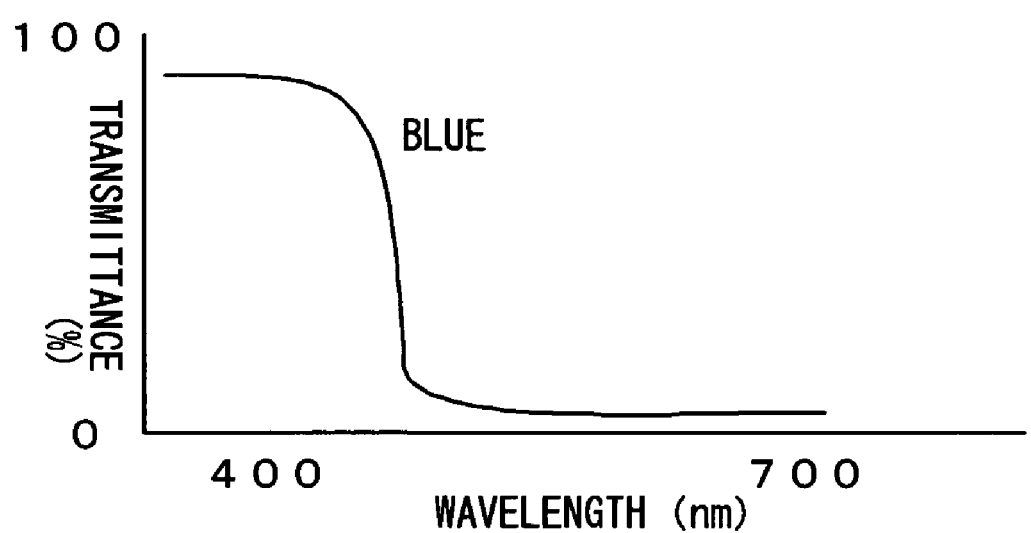
FIG. 2 includes graphs showing the transmittance of blue light and the reflectance of red and green light of a first dichroic mirror 13 shown in FIG. 1.
Figure 2:
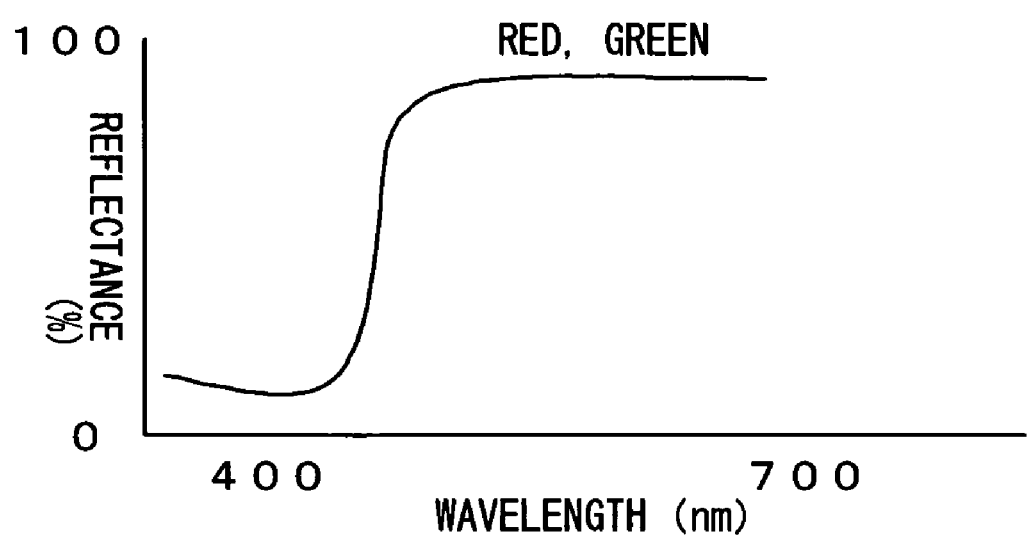

FIG. 2 includes graphs showing the transmittance of blue light and the reflectance of red and green light of the first dichroic mirror 13 shown in FIG. 1. As shown in the drawing, the first dichroic mirror 13 has the function of passing blue light and reflecting red and green light.

Figure 3:
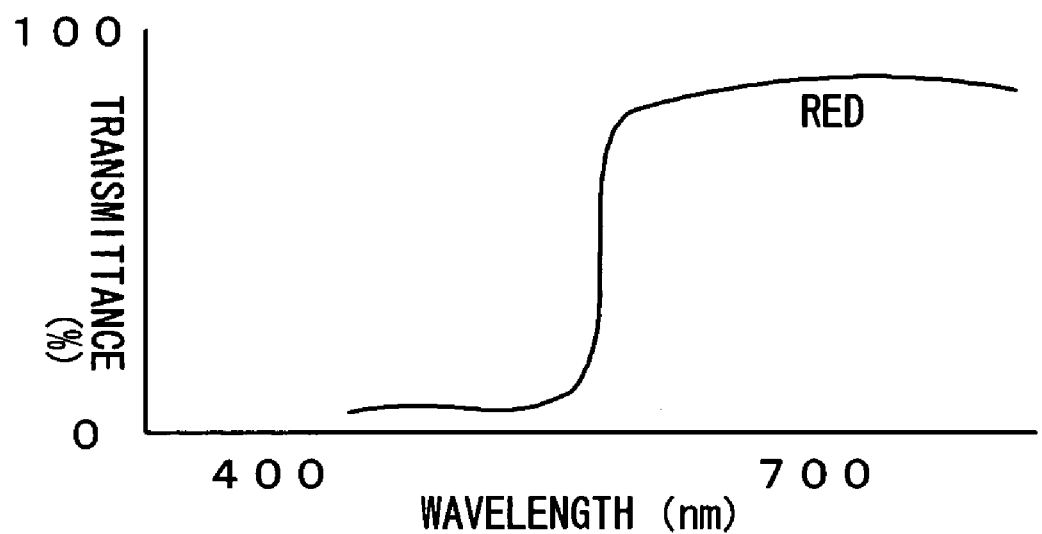
FIG. 3 includes graphs showing the transmittance of red light and the reflectance of green light of a second dichroic mirror 14 shown in FIG. 1.
Figure 3:
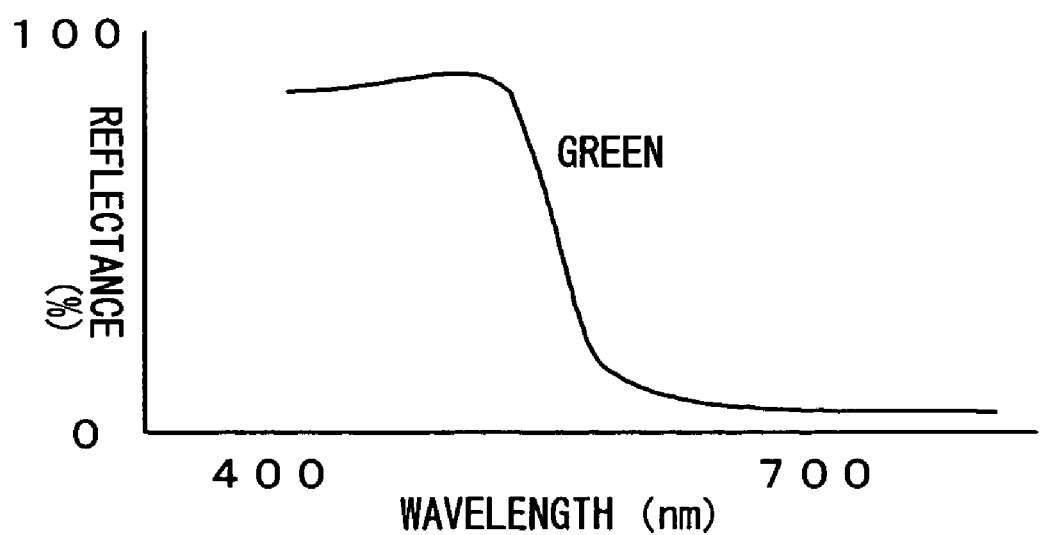
Figure 5:
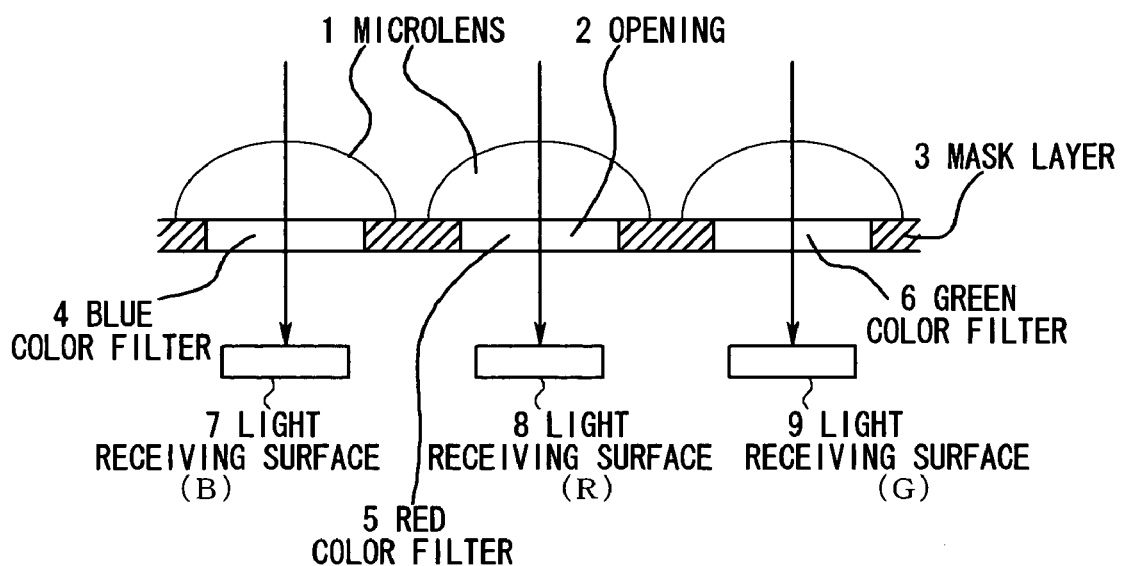
FIG. 5 is a sectional view of a color separation unit included in a conventional single-CCD image sensor.
Figure 6:
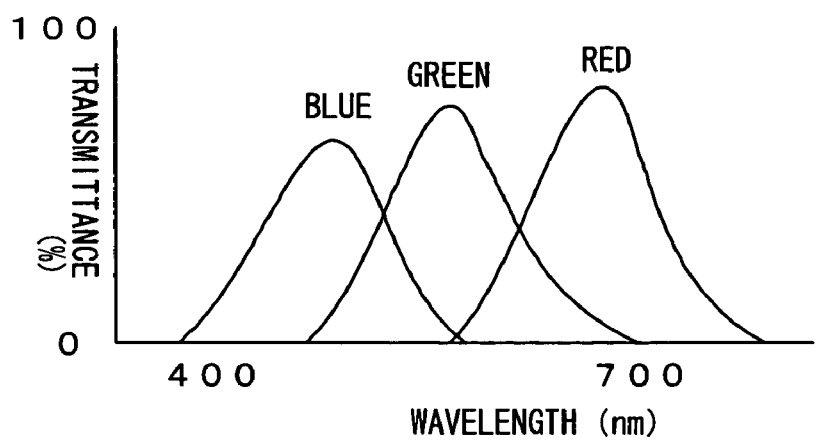
FIG. 6 is a graph showing the spectral transmittance of a color separation filter of the color separation unit included in the conventional single-CCD image sensor shown in FIG. 5.

FIG. 3 includes graphs showing the transmittance of red light and the reflectance of green light of the second dichroic mirror 14 shown in FIG. 1. As shown in the drawing, the second dichroic mirror 14 has the function of passing red light and reflecting green light.

FIGS. 2 and 3 indicate that the dichroic mirrors 13 and 14 divide incident light into transmitted light and reflected light.

FIG. 4 is a top plan view of the color separation unit of the solid-state image sensor shown in FIG. 1. As shown in the drawing, the microlens 11 has such size as to cover the three light receiving surfaces 16 to 18. The microlens 11 condenses the whole light, which is applied to the three light receiving surfaces 16 to 18 in ordinary cases, to the opening 12 provided in the first light receiving surface 16. Therefore, since the microlens 11 condenses light, which irradiates the three light receiving surfaces 16 to 18, to the opening 12, photon utilization efficiency does not decrease even though only the single opening 12 is provided per the three light receiving surfaces 16 to 18.

According to this embodiment, false color does not appear because completely separated blue, green, and red light is applied to the independent light receiving surfaces 16 to 18 of the CCD, respectively. Also, it becomes unnecessary to form color by the interpolation between pixels, though it is necessary in prior art.

Furthermore, the light receiving surfaces according to this embodiment can efficiently receive blue, green and red light, as compared with the conventional light receiving surfaces. Thus, it is possible to provide a color separation unit of a solid-state image sensor, applied to a digital still camera, a video camera and the like, which can prevent the occurrence of camera movement and subject movement even in low-light levels.

When electric signals obtained with the photoelectric conversion are so amplified as to have the same sensitivity as that of the conventional photoelectric transducers, it is possible to provide image signals with less noise.

Since it becomes unnecessary to form color by interpolation, false color does not appear in principle. Therefore, it is unnecessary to carry out false color correction processing (which is normally carried out concurrently with interpolation processing) by using a signal processing circuit and the like. Therefore, using the color separation unit of the solid-state image sensor according to this embodiment makes it possible to provide an imaging device which achieves high image quality at low cost with low power consumption.

The dichroic mirrors are used in the above embodiment, but the present invention is not limited to them. Instead, dichroic prisms, dichroic mirrors with filters, or the like may be used.

The invention is not limited to the above embodiments and various modifications may be made without departing from the spirit and scope of the invention. Any improvement may be made in part or all of the components.

What is claimed is:

1. A solid-state image sensor comprising:
a micro lens which condenses light to an opening provided in a mask layer;
a first optical element which receives light condensed by said micro lens through said opening, to divide the light into light to be transmitted and light to be reflected in accordance with wavelengths of the light received;
a first light receiving surface which receives light passed through said first optical element;
a second optical element which receives light reflected by said first optical element to divide the light into light to be transmitted and light to be reflected in accordance with wavelengths of the received light different from those of said first optical element;
a second light receiving surface which receives light reflected by said second optical element;
a third optical element which receives and reflects light passed through said second optical element; and
a third light receiving surface which receives light reflected by said third optical element,
wherein the mask layer masks the second and third optical elements so that light passed through the micro lens is not directly incident to the second and third optical elements.

2. A solid-state image sensor comprising:
a micro lens which condenses light to an opening provided in a mask layer;
a first optical element which receives light condensed by said micro lens through said opening, to divide the light into light to be transmitted and light to be reflected in accordance with wavelengths of the light received;
a first light receiving surface which receives light passed through said first optical element;
a second optical element which receives light reflected by said first optical element to divide the light into light to be transmitted and light to be reflected in accordance with wavelengths of the received light different from those of said first optical element;
a second light receiving surface which receives light reflected by said second optical element;
a third optical element which receives and reflects light passed through said second optical element; and
a third light receiving surface which receives light reflected by said third optical element,
wherein the mask layer is disposed between the micro lens and the second optical element, and between the micro lens and the third optical element.

3. A solid-state image sensor comprising:
a micro lens which condenses light to an opening provided in a mask layer;
a first optical element which receives light condensed by said micro lens through said opening, to divide the light into light to be transmitted and light to be reflected in accordance with wavelengths of the light received;
a first light receiving surface which receives light passed through said first optical element;
a second optical element which receives light reflected by said first optical element to divide the light into light to be transmitted and light to be reflected in accordance with wavelengths of the received light different from those of said first optical element;
a second light receiving surface which receives light reflected by said second optical element;
a third optical element which receives light passed through said second optical element to divide the light into light to be transmitted and light to be reflected in accordance with wavelengths of the received light different from those of said first and second optical elements; and
a third light receiving surface which receives light reflected by said third optical element,
wherein the mask layer is disposed between the micro lens and the second optical element, and between the micro lens and the third optical element.

* * * * *